(12) United States Patent
Jang et al.

(10) Patent No.: US 11,371,516 B2
(45) Date of Patent: Jun. 28, 2022

(54) MOTOR FOR DUAL FANS WITH ONE SHAFT

(71) Applicant: NEW MOTECH CO., LTD., Gwangju (KR)

(72) Inventors: Jeong Cheol Jang, Gwangju (KR); Ji Min Lee, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 168 days.

(21) Appl. No.: 16/965,306

(22) PCT Filed: Jan. 16, 2019

(86) PCT No.: PCT/KR2019/000632
§ 371 (c)(1),
(2) Date: Jul. 28, 2020

(87) PCT Pub. No.: WO2019/198915
PCT Pub. Date: Oct. 17, 2019

(65) Prior Publication Data
US 2021/0115931 A1    Apr. 22, 2021

(30) Foreign Application Priority Data
Apr. 12, 2018  (KR) .................. 10-2018-0042535

(51) Int. Cl.
*F04D 25/06*  (2006.01)
*F04D 25/08*  (2006.01)
(Continued)

(52) U.S. Cl.
CPC ............... *F04D 25/06* (2013.01); *A47L 9/22* (2013.01); *B60H 1/00* (2013.01); *F04D 25/08* (2013.01);
(Continued)

(58) Field of Classification Search
CPC ........ F16C 35/02; F16C 35/10; F04D 17/162; F04D 25/08; F04D 29/056; F04D 29/0563; F04D 29/263
(Continued)

(56) References Cited

U.S. PATENT DOCUMENTS 6,896,478 B2   5/2005  Botros et al.
8,998,495 B2 * 4/2015  Hirose ................. G03G 15/751
                                            384/282
(Continued)

FOREIGN PATENT DOCUMENTS

JP   11-027893 A    1/1999
JP   2014-176102 A  9/2014
(Continued)

OTHER PUBLICATIONS

International Search Report for PCT/KR2019/000632 dated Apr. 22, 2019 from Korean Intellectual Property Office.

*Primary Examiner* — Kenneth J Hansen
(74) *Attorney, Agent, or Firm* — Revolution IP, PLLC

(57) ABSTRACT

A motor for dual fans includes: a body on which a stator is installed; a shaft which is coupled to a rotor located to be opposite to the stator to rotate together and is extended to an upper part and a lower part of the body; a first fan which is coupled to an upper part of the shaft; and a second fan which is coupled to a lower part of the shaft, characterized in that a first unidirectional bearing is coupled to the first fan, and thereby an inner race of the first unidirectional bearing is coupled to an upper part of the shaft to rotate, and a second unidirectional bearing is coupled to the second fan, and thereby an inner race of the second unidirectional bearing is coupled to the lower part of the shaft to rotate.

4 Claims, 4 Drawing Sheets

(51) Int. Cl.
  *F04D 29/056* (2006.01)
  *F04D 29/26* (2006.01)
  *H02K 7/08* (2006.01)
  *H02K 7/14* (2006.01)
  *A47L 9/22* (2006.01)
  *B60H 1/00* (2006.01)

(52) U.S. Cl.
  CPC ......... *F04D 29/056* (2013.01); *F04D 29/263* (2013.01); *H02K 7/083* (2013.01); *H02K 7/14* (2013.01)

(58) Field of Classification Search
  USPC ................................ 384/275, 282, 283, 296
  See application file for complete search history.

(56) References Cited

U.S. PATENT DOCUMENTS

2006/0276122 A1* 12/2006 Cheng .................. F04D 25/166
 454/254
2015/0136188 A1* 5/2015 Xu ...................... A47L 15/4225
 134/186

FOREIGN PATENT DOCUMENTS

| KR | 10-2004-0067094 A | 7/2004 |
| KR | 10-2014-0089075 A | 7/2014 |
| KR | 10-2018-0020050 A | 2/2018 |

* cited by examiner

[Fig. 1]
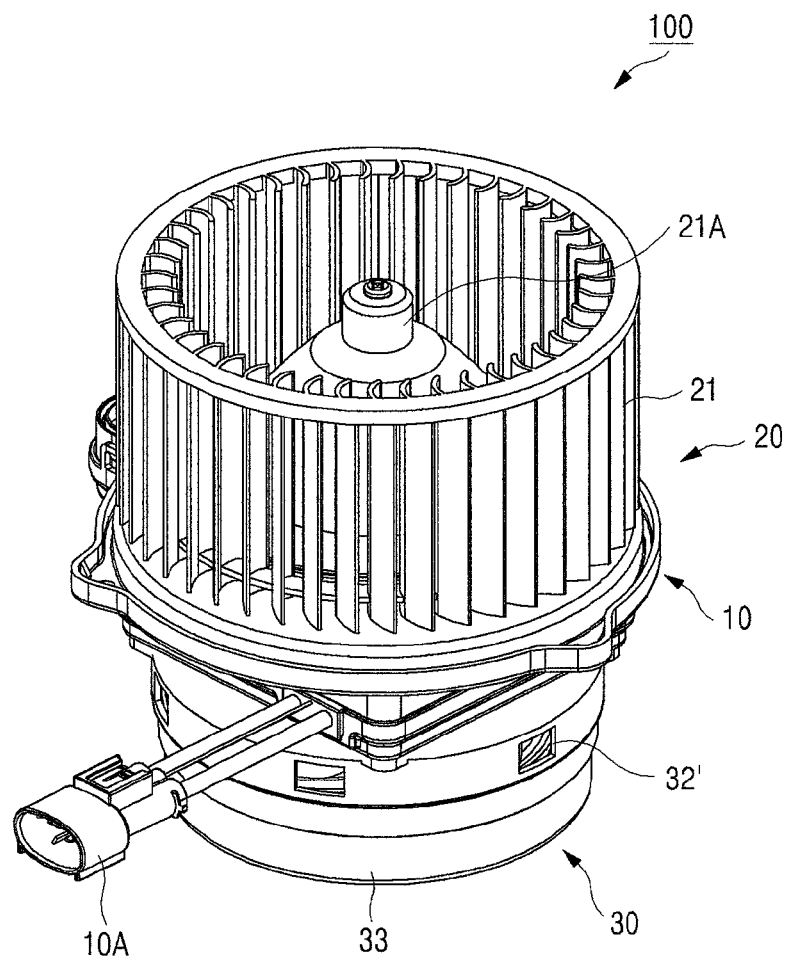

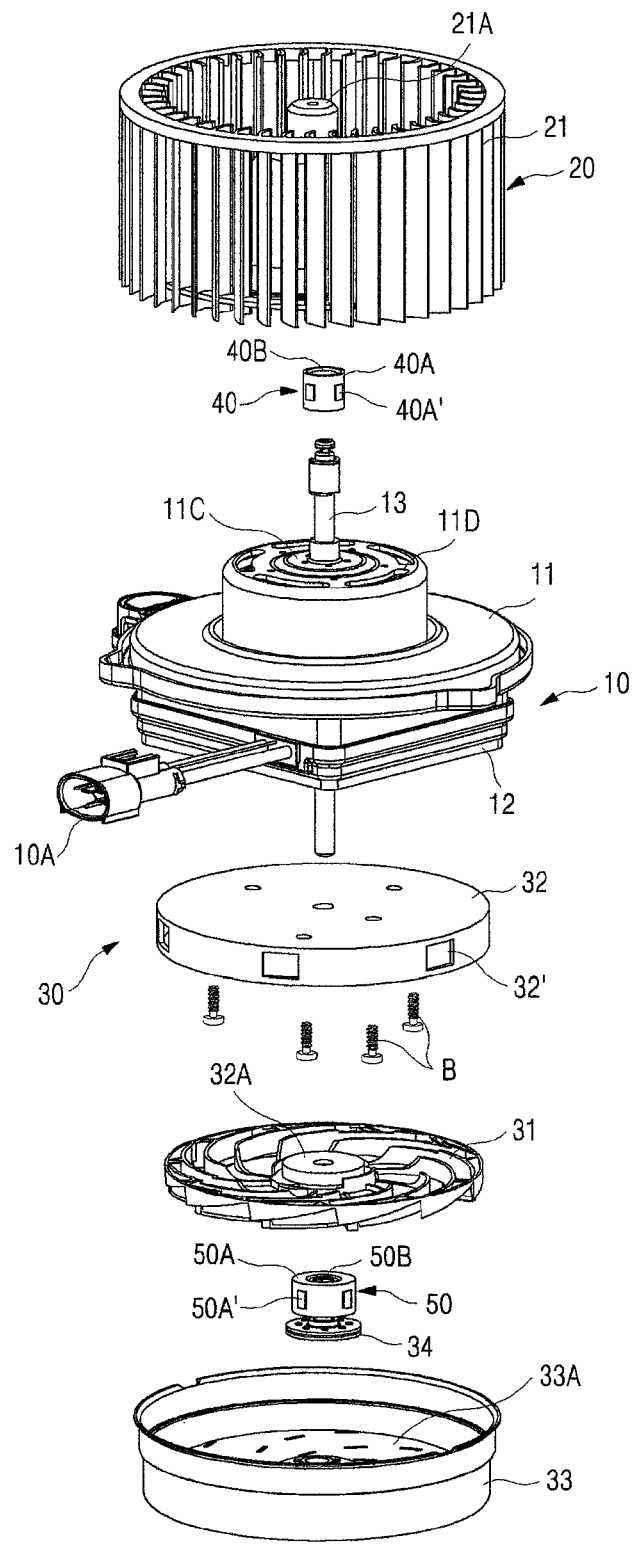
[Fig. 2]

[Fig. 3]
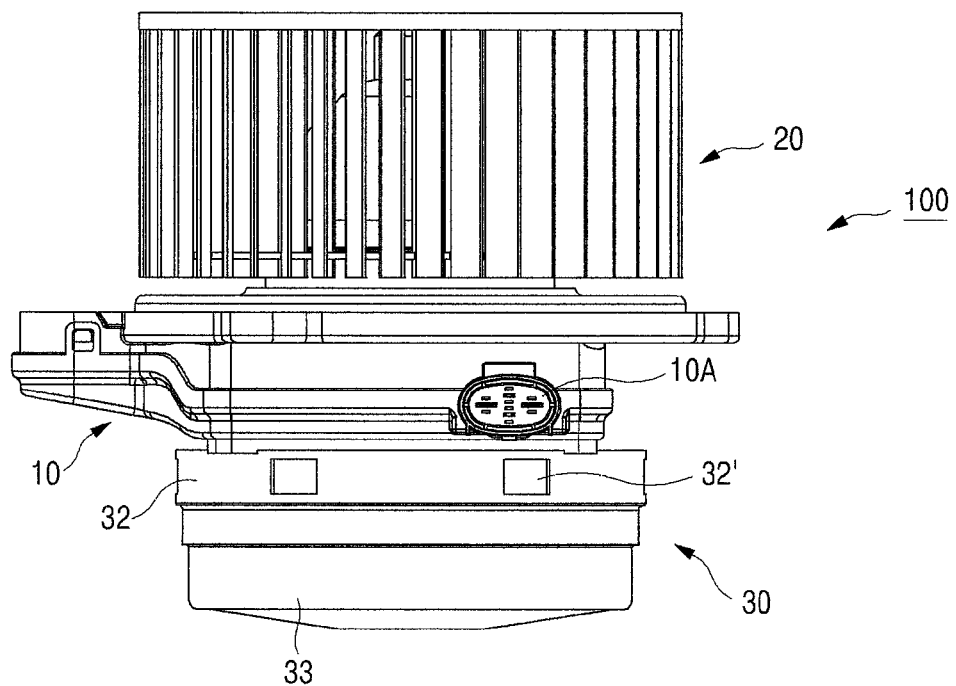

[Fig. 4]
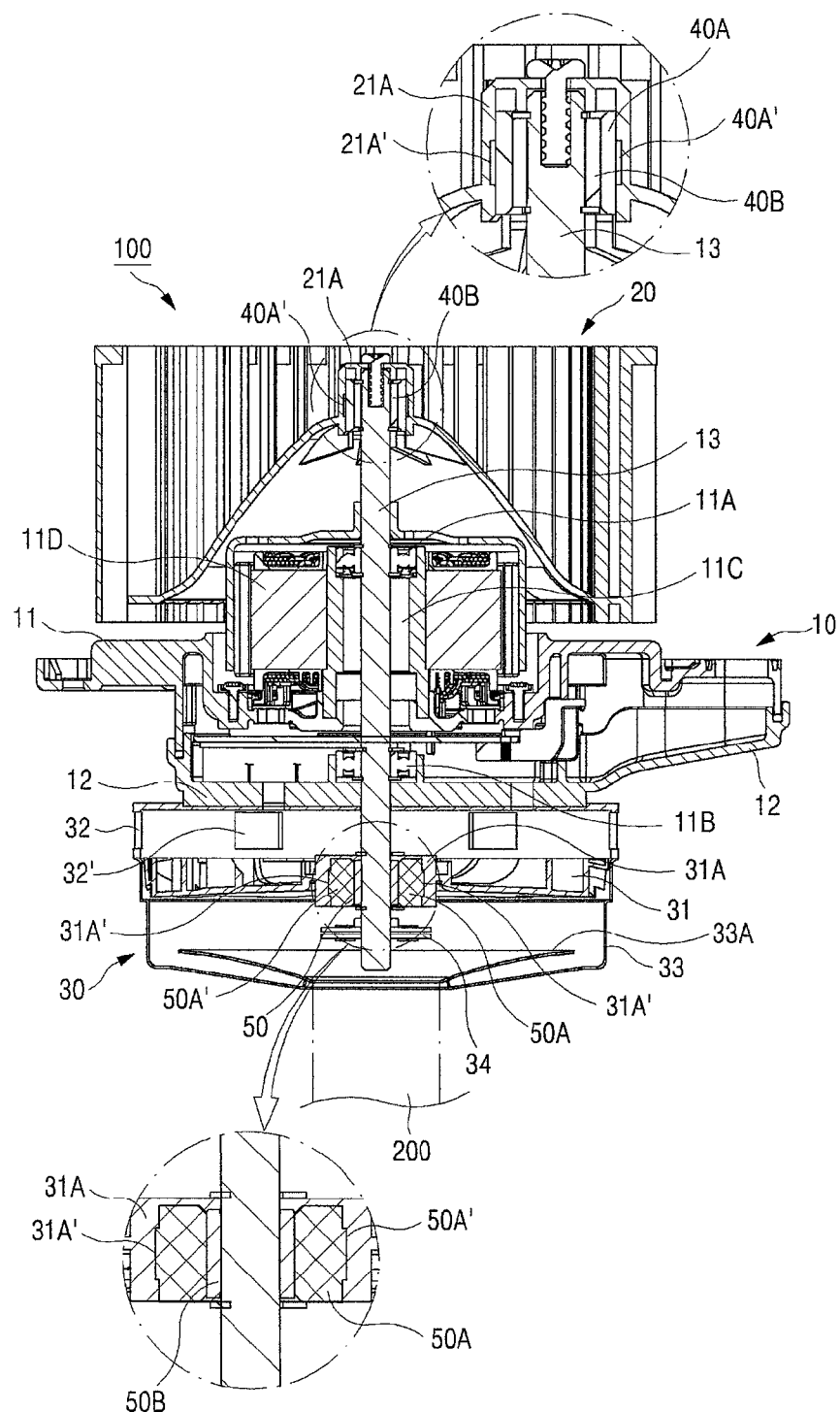

MOTOR FOR DUAL FANS WITH ONE SHAFT

TECHNICAL FIELD

The present invention relates to a motor for dual fans. More specifically, the present invention relates to a motor for dual fans capable of coupling two loads to one motor shaft, while operating each load separately.

BACKGROUND ART

In general, vehicles have fan motors for heating ventilation and air conditioning applied thereto to circulate the indoor air. These fan motors for heating ventilation and air conditioning are located in the front of the vehicles where the air conditioner or heater is located. However, recently, as cars become larger, and vehicles for leisure or sport utility vehicles have spacious interior, fan motors for heating ventilation and air conditioning are also applied in the backseats or trunks of the vehicles. Meanwhile, recently, as for the case of premium vehicles for leisure or sport utility vehicles, vacuum cleaners for cleaning the vehicles are sometimes installed in the trunk side. These vacuum cleaners need fan motors for inhaling dust.

When a heating ventilation and air conditioning (HVAC) system for circulating the air is applied together with the vacuum cleaner in one vehicle, a fan motor for the HVAC and a fan motor for the cleaner should be applied separately. If these two motors are applied separately, the manufacturing costs would increase, and there could be certain restrictions in the space design for two motors. Accordingly, if a fan for the cleaner is added to the fan motor used in the HVAC system so that one motor is used for two instruments, the above-mentioned problem could be solved.

U.S. Pat. No. 6,896,478 discloses a dual fan blower which axially connects two fans to one motor, and circulates the air through a chamber on which each fan is located. Said patent discloses a technology that when one motor shaft rotates, two fans coupled to each end of the motor shaft, respectively, rotate together so as to operate two fans at the same time with one motor. However, since the two fans always have to be operated together, when the dual fan blower is applied to the device for heating ventilation and air conditioning and the vacuum cleaner at the same time, the fan of the air conditioner and the fan of the cleaner always have to be operated at the same time, thereby raising a problem in the application thereof.

In order to solve the above-mentioned problem, the present inventors suggest a motor for dual fans capable of coupling two fans to one motor shaft, while selectively driving two fans without rotating them at the same time.

DISCLOSURE OF INVENTION

Technical Problem

It is an object of the present invention is to provide a motor for dual fans capable of selectively driving two fans with one motor.

It is another object of the present invention is to provide a motor for dual fans capable of coupling a cleaning inhalation fan to a shaft of the motor for heating ventilation and air conditioning on which a blower fan is mounted, thereby enabling the motor to be used for both the device for heating ventilation and air conditioning and the cleaner.

The objects above and other objects inferred therein may be easily carried out by the present invention explained below.

Solution to Problem

The motor for dual fans according to the present invention comprises a body (10) on which a stator is installed; a shaft (13) which is coupled to a rotor located to be opposite to the stator to rotate together and is extended to an upper part and a lower part of the body (10); a first fan (21) which is coupled to an upper part of the shaft (13); and a second fan (31) which is coupled to a lower part of the shaft (13), characterized in that a first unidirectional bearing (40) is coupled to the first fan (21), and thereby an inner race of the first unidirectional bearing (40) is coupled to an upper part of the shaft (31) to rotate, and a second unidirectional bearing (50) is coupled to the second fan (31), and thereby an inner race of the second unidirectional bearing (50) is coupled to the lower part of the shaft (13) to rotate.

In the present invention, it is preferable that when the shaft (13) rotates toward one direction, only one of the first fan (21) or the second fan (31) rotates in the same direction as the shaft (13), and the other does not rotate.

In the present invention, the first unidirectional bearing (40) may be coupled to a central fixing portion (21A) of the first fan (21) into which an upper part of the shaft (13) is inserted, and an insertion projection (40A') formed in an outer race (40A) of the first unidirectional bearing (40) may be coupled to an insertion recess (21A') formed in an inner boundary surface of the central fixing portion (21A).

In the present invention, the second directional bearing (50) may be coupled to a central fixing portion (31A) of the second fan (31) into which a lower part of the shaft (13) is inserted, and an insertion projection (50A') formed in an outer race (50A) of the second unidirectional bearing (50) may be coupled to an insertion recess (31A') formed in an inner boundary surface of the central fixing portion (31A).

The motor for dual fans according to the present invention may further comprise a guiding housing (32) which is coupled to a lower part of the body (10); and an inducing housing (33) which is coupled to a lower part of the guiding housing (32), wherein an air inducing guiding plate (33A) whose upper part is broad and lower part is narrow may be installed on the inner side of the inducing housing (33).

Advantageous Effects of Invention

The present invention has the effect of providing a motor for dual fans capable of selectively driving two fans with one motor. Furthermore, the present invention has the effect of providing a motor for dual fans capable of applying a cleaning inhalation fan to a shaft of the fan motor for heating ventilation and air conditioning on which the blower fan is mounted together so that the motor can be used for both the device for heating ventilation and air conditioning and the cleaner, thereby saving the space to have the motor installed in the vehicle and costs, and reducing electric power consumed in the vehicle.

BRIEF DESCRIPTION OF DRAWINGS

FIG. 1 is a perspective view illustrating the motor for dual fans according to the present invention;

FIG. 2 is an exploded perspective view illustrating the motor for dual fans according to the present invention;

FIG. 3 is a side view illustrating the motor for dual fans according to the present invention; and FIG. 4 is a cross-sectional view illustrating the motor for dual fans according to the present invention.

MODE FOR THE INVENTION

FIG. 1 is a perspective view illustrating the motor for dual fans (100) according to the present invention, FIG. 2 is an exploded perspective view illustrating the motor for dual fans (100) according to the present invention, and FIG. 3 is a side view. When referring to FIGS. 1 to 3 together, the motor for dual fans according to the present invention comprises a body (10), a first fan unit (20), and a second fan unit (30).

The body (10) comprises an upper housing (11) and a lower housing (12), and a shaft (13) penetrates into a central portion of the body. The upper part and lower part of the shaft (13) protrudes to upper and lower parts of the upper housing (11) and the lower housing (12), respectively, and thus loads are coupled to the upper and lower parts of the shaft (13), respectively. In the present invention, two fans are coupled to the upper and lower parts of the shaft (13), respectively. In other words, a first fan (21) is coupled to the upper part of the shaft (13), and a second fan (31) is coupled to the lower part of the shaft (13).

The first fan unit (20) is located on the upper part of the body (10), and comprises a first fan (21) coupled to the upper part of the shaft (13). Preferably, the first fan may be a blower fan constituting the device for heating ventilation and air conditioning of a vehicle. An outer race (40A) of a first unidirectional bearing (40) is fixed and coupled to the center of the first fan (21), and the upper part of the shaft (13) is coupled to an inner race (40B) of the first unidirectional bearing (40) to rotate. When the shaft (13) rotates toward one direction, the shaft rotates together with the first fan (21), and when the shaft rotates in the other direction, the first fan (21) does not rotate, but only the shaft (13) rotates.

The second fan unit (30) is located on the lower part of the body (10), and comprises a second fan (31) coupled to a lower distal end of the shaft (13). Preferably, the second fan (31) may be an inhalation fan for a vacuum cleaner. Accordingly, according to the motor for dual fans (100) according to the present invention, the blower fan and the fan for the vacuum cleaner used in the vehicle may be driven with one motor. As such, since the second fan (31) is used for the cleaner, it is located inside a space where a guiding housing (32) which is coupled by a bolt (B), etc. to the lower part of the body (10), and an inducing housing (33) coupled to the lower part of the guiding housing (32) are located.

The outer race (50A) of the second unidirectional bearing (50) is fixed and coupled to the center of the second fan (31), and the lower part of the shaft (13) is coupled to the inner race (50B) of the second unidirectional bearing (50) to rotate. When the shaft (13) rotates toward one direction, the shaft rotates together with the second fan (31), and when the shaft rotates in the other direction, the second fan (31) does not rotate, but only the shaft (13) rotates.

By such constitution, according to the motor for dual fans (100) according to the present invention, when one fan rotates, the other fan may not rotate. For example, when the shaft (13) rotates in the clockwise direction seen from the upper side, by using the first and second unidirectional bearings (40, 50), it may be implemented so that the first fan (21) rotates together with the shaft (13) in the clockwise direction, and the second fan (31) does not rotate and stays in place. When the shaft (13) rotates in the counterclockwise direction, to the contrary, it may be implemented so that only the second fan (31) rotates together with the shaft (13) in the counterclockwise direction, and the first fan (21) does not rotate. By such constitution, it becomes possible to drive two fans with one motor, while allowing only one of the two fans to be driven and the other fan not to be driven.

The second fan (31) is located in the inner space formed by the guiding housing (32) and the inducing housing (33). The guiding housing (32) has a plurality of air discharging holes (32') formed therein. The inducing housing (33) is coupled to the lower part of the guiding housing (32). Additionally, an inhalation flow path (200) is connected to a central portion of the inducing housing (33), and thereby the air inhaled by the second fan (31) is induced to the inner space of the guiding housing (32) and the inducing housing (33). The air induced to the inner space of the inducing housing (33) is discharged through the air discharging hole (32') of the guiding housing (32).

FIG. 4 is a cross-sectional view illustrating the motor for dual fans (100) according to the present invention. When referring to FIG. 4, an upper bearing (11A) is coupled to a central portion of an upper housing (11) forming the body (10), and a lower bearing (11B) is coupled to a central portion of a lower housing (12). The upper bearing (11A) and lower bearing (11B) support the shaft so that the shaft could rotate bilaterally. Between the upper bearing (11A) and the lower bearing (11B), a rotor (11C) is coupled to the shaft (13) to rotate together with the shaft (13). A stator (11D) is coupled to the upper housing (11) with respect to the rotor (11C) on both sides. A power connector (10A) for supplying power to the stator (11D) is formed in the side surface of the upper housing (11) or the lower housing (12).

When power is applied to the stator (11D), and thereby the rotor (11C) rotates in one direction, and the second fan (31) is driven, the first fan (21) is not driven. In this case, the outdoor air flows inside the second fan unit (30) through the inhalation flow path (200), and the air flowed in may be guided by the air inducing guiding plate (33A) installed inside the inducing housing (33). The air inducing guiding plate (33A) may have a broad upper part and a narrow lower part. A stopper (34) is installed between the second fan (31) and the air inducing guiding plate (33A), and prevents the second fan (31) or the second unidirectional bearing (50) from contacting the air inducing guiding plate (33A).

The first unidirectional bearing (40) is coupled to the central fixing portion (31A) of the first fan (21). It is preferable that the insertion projection (40A') is projected and formed in the outer race (40A) of the first unidirectional bearing (40). This insertion projection (40A') is inserted into an insertion recess (21A') formed in the central fixing portion (21A) so that the first unidirectional bearing (40) could be coupled to the central fixing portion (21A) more firmly. Therefore, the insertion projection may prevent the first unidirectional bearing (40) from leaving when the first unit (20) operates.

In the same manner, the second unidirectional bearing (50) is coupled to the central fixing portion (31A) of the second fan (31). It is preferable that the insertion projection (50A') is projected and formed in the outer race (50A) of the second unidirectional bearing (50). This insertion projection (50A') is inserted into an insertion recess (31A') formed in the central fixing portion (31A) so that the second unidirectional bearing (50) could be coupled to the central fixing portion (31A) more firmly. Therefore, the insertion projection may prevent the second unidirectional bearing (50) from leaving when the second unit (30) operates.

By the above constitution, the present invention is capable of having fans coupled to the upper and lower parts of the motor for dual fans (100), separately, and driving each fan separately, thereby driving two loads individually with one motor. Therefore, the present invention does not comprise a fan motor for heating ventilation and air conditioning and an inhalation motor for cleaning separately, but this could be implemented with one motor, thereby saving manufacturing costs and reducing the space occupied by the motor.

The detailed description of the present invention described as above simply explains examples for understanding the present invention, but does not intend to limit the scope of the present invention. The scope of the present invention is defined by the accompanying claims. Additionally, it should be construed that simple modifications or changes of the present invention fall within the scope of the present invention.

The invention claimed is:

1. A motor for dual fans, comprising:
    a body (10) on which a stator is installed;
    a shaft (13) which is coupled to a rotor located to be opposite to the stator to rotate together and is extended to an upper part and a lower part of the body (10);
    a first fan (21) which is coupled to an upper part of the shaft (13);
    a second fan (31) which is coupled to a lower part of the shaft (13),
    a guiding housing (32) which is coupled to the lower part of the body (10);
    an inducing housing (33) which is coupled to a lower part of the guiding housing (32); and
    an air inducing guiding plate (33A) which is installed on an inner side of the inducing housing (33),
    wherein an upper part of the air inducing guiding plate (33A) is broader than a lower part of the air inducing guiding plate (33A),
    wherein a first unidirectional bearing (40) is coupled to the first fan (21), and thereby an inner race of the first unidirectional bearing (40) is coupled to the upper part of the shaft (13) to rotate, and a second unidirectional bearing (50) is coupled to the second fan (31), and thereby an inner race of the second unidirectional bearing (50) is coupled to the lower part of the shaft (13) to rotate.

2. The motor for dual fans according to claim 1, wherein when the shaft (13) rotates toward one direction, only one of the first fan (21) or the second fan (31) rotates in the same direction as the shaft (13), and the other does not rotate.

3. The motor for dual fans according to claim 1, wherein the first unidirectional bearing (40) is coupled to a central fixing portion (21A) of the first fan (21) into which the upper part of the shaft (13) is inserted, and an insertion projection (40A') formed in an outer race (40A) of the first unidirectional bearing (40) is coupled to an insertion recess (21A') formed in an inner boundary surface of the central fixing portion (21A).

4. The motor for dual fans according to claim 1, wherein the second unidirectional bearing (50) is coupled to a central fixing portion (31A) of the second fan (31) into which the lower part of the shaft (13) is inserted, and an insertion projection (50A') formed in an outer race (50A) of the second unidirectional bearing (50) is coupled to an insertion recess (31A') formed in an inner boundary surface of the central fixing portion (31A).

* * * * *